June 8, 1965   R. C. BULLENE   3,188,566
INTERMODULATION MEASUREMENT SYSTEM INCLUDING
RESONANT FILTER TRAP MEANS
Filed Oct. 8, 1962   2 Sheets-Sheet 1

INVENTOR.
ROBERT C. BULLENE
BY Marvin Moody
ATTORNEY 3,188,566
INTERMODULATION MEASUREMENT SYSTEM INCLUDING RESONANT FILTER TRAP MEANS
Robert C. Bullene, Hiawatha, Iowa, assignor to Collins Radio Company, Cedar Rapids, Iowa, a corporation of Iowa
Filed Oct. 8, 1962, Ser. No. 229,036
5 Claims. (Cl. 324—128)

This invention relates in general to test and measuring means and in particular to means for measuring intermodulation products occurring when a plurality of frequencies are mixed and passed through a nonlinear device.

Oftentimes it is desired to connect two or more transmitters to a common antenna through a nonlinear device which gives rise to intermodulation product. It has been difficult to measure intermodulation products and it is an object of this invention to provide means for making such measurements.

Another object of this invention is to provide an improved test and measuring apparatus.

A feature of this invention is found in the provision for a combination of frequency traps used in measuring intermodulation products that can occur when more than one frequency is passed through a nonlinear device. Further features, objects and advantages will become apparent in view of the drawings in which:

FIGURE 1 illustrates a transmitter 10 which produces an output frequency which is supplied to a multicoupler 11.

A second multicoupler 9 receives an input from a second transmitter 12 at a frequency $F_2$. The outputs of multicoupler 9 and 11 are supplied to a nonlinear device 14, which might be, for example, a discriminator. It is well known that nonlinear devices produce intermodulation products and it is an object of this invention to provide means for measuring these.

Figure 1:
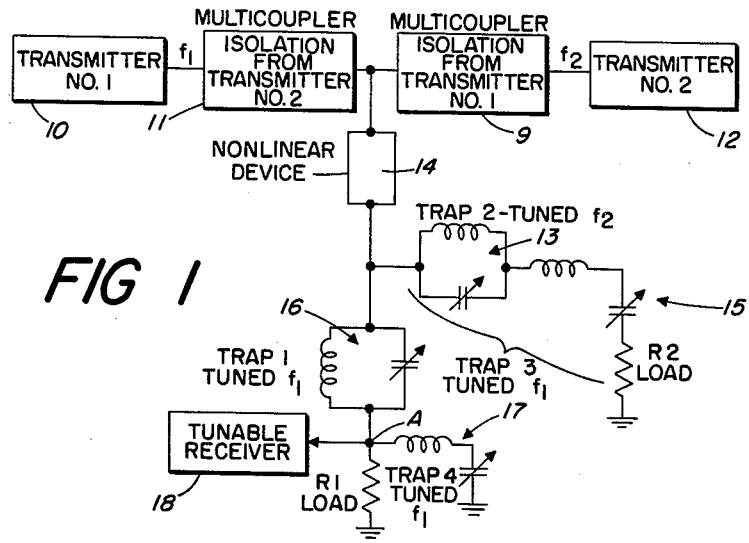
FIGURE 1 is a block diagram of applicant's invention for measuring intermodulation products.
Figure 3:
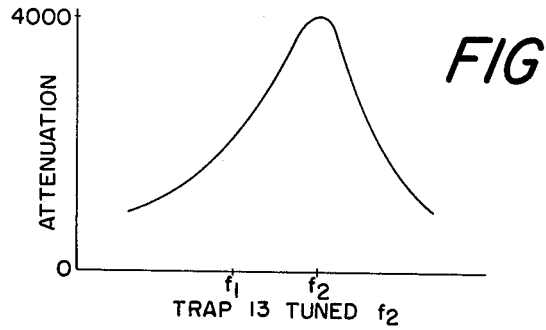
FIGURE 3 illustrates the frequency response of trap #2 in FIGURE 1.
Figure 4:
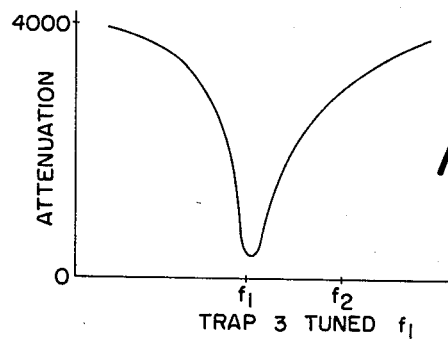
FIGURE 4 illustrates the frequency response of trap #3 in FIGURE 1.
Figure 5:
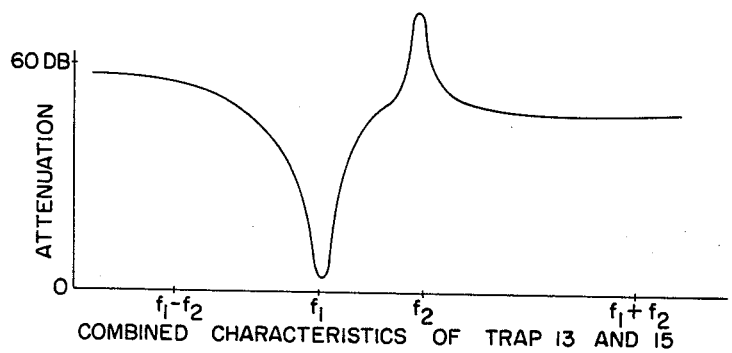
FIGURE 5 illustrates the frequency response of traps #2 and #3 of FIGURE 1.
Figure 6:
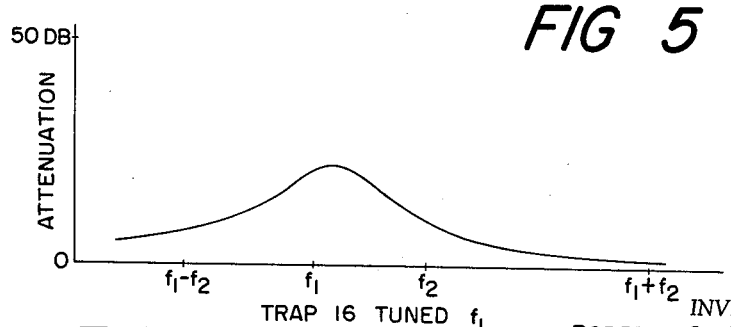
FIGURE 6 illustrates the frequency response of trap #1 in FIGURE 1.

This is accomplished by the use of four traps as shown in FIGURE 1. Trap #13 is parallel tuned to frequency $f_2$ so as to provide a high impedance to $f_2$. The frequency response of trap #13 is shown in FIGURE 3. Trap 15 is connected between ground and trap 13. The combination of traps 13 and 15 are series resonant at frequency $f_1$, as shown in FIGURE 5. The output of transmitter 10 appearing at discriminator 14 will see a series resonant circuit to ground which will be a low impedance for $f_1$. This frequency will be bypassed to ground at this point. Intermodulation products and frequency $f_2$ will see a relatively high impedance at this point. A third trap 16 is parallel resonant at frequency $f_1$. Trap 16 is connected to the output of discriminator 14. As shown in FIGURE 6 trap 16 provides a high impedance to frequency $f_1$. A fourth trap 17 is connected to the output of trap 16 and is series resonant at frequency $f_1$ so as to provide a low impedance to any signal at frequency $f_1$ that may have passed through trap 16. Thus at point A between traps 16 and 17 signals at frequency $f_2$ and intermodulation products originating in the nonlinear device 14 will be present. These signals appear across a resistor $R_1$ and are supplied to a tunable receiver 18. Receiver 18 is capable of detecting and measuring intermodulation products and $f_2$ that exist across the load $R_1$. Thus, by the use of traps 13, 15, 16 and 17, intermodulation products may be measured. Trap 13 has a relatively high Q as does trap 3. As shown in FIGURE 5, $F_1$ passes through traps 13 and 14 to ground. Trap 16 has a low Q so that intermodulation products and $f_2$ easily pass to point "A."

In order to measure intermodulation products and the amount of power supplied to the load from the transmitter 12 the receiver is tuned to $f_2$ and power is noted at this frequency. The receiver is then tuned through a frequency range which includes the intermodulation products $f_1+f_2$, $f_1-f_2$ and higher order intermodulation frequencies, and the power at these frequencies can be determined.

The power from transmitter 10 at frequency $f_1$ can be obtained at receiver 18 by tuning the traps 13, 15, 16 and 17 so that the frequency $f_2$ is bypassed to ground by traps 13 and 15 and 17 and blocked by trap 16.

Figure 2:
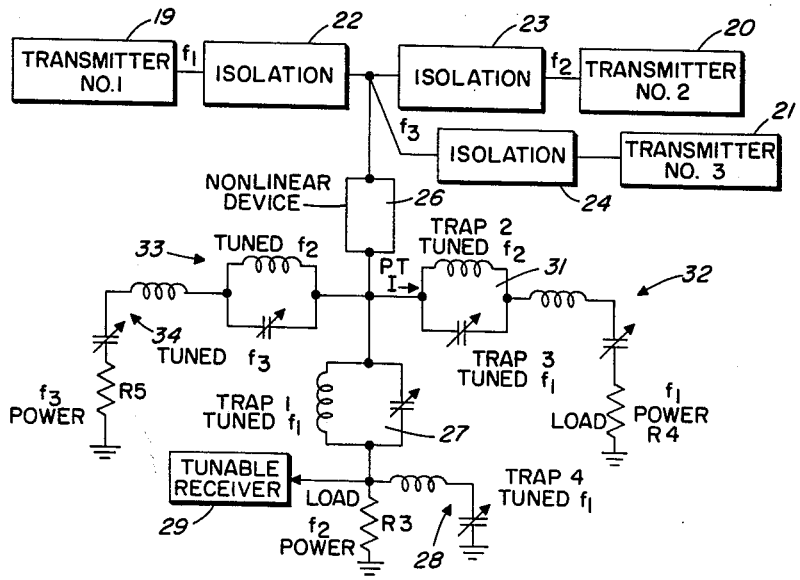
FIGURE 2 illustrates a modification of the invention.

The apparatus shown in FIGURE 2 illustrates the manner in which three transmitters can be connected to a nonlinear device so that intermodulation products can be measured. Transmitters 19, 20 and 21 are connected to isolators as, for example, multicouplers 22, 23 and 24. The output of multicouplers 22, 23 and 24 are connected together and are supplied to a nonlinear device 26. The output of nonlinear device 26 is connected to a trap 27 which is similar to trap 16 and is parallel resonant frequency $f_1$. A load $R_3$ is connected to the output of trap 27 and is in parallel to ground with a trap 28 which is series resonant at frequency $f_1$. A tunable receiver 29 is connected across resistor $R_3$. A trap 31 is parallel resonant at frequency $f_2$ and also reverses the output of nonlinear device 26. A trap 32 is connected to trap 31. Traps 32 and 31 are series resonant at frequency $f_1$. A load $R_4$ is connected in series with trap 32. A fifth trap 33 is connected to nonlinear device 26 and is parallel resonant at frequency $f_2$. A trap 34 is connected to the trap 33 and the combination is series resonant at frequency $f_3$. A load $R_5$ is connected to trap 34.

The tunable receiver 29 may be tuned to indicate the power across resistor $R_3$ at various frequencies. Power from transmitter 20 may be measured and transmitters will appear across resistor $R_3$ and be measured by receiver 29. Thus, means are provided for measuring intermodulation products by the three transmitters. Although systems have been described with two and three transmitters it is to be realized that it may be adapted to measure power from any sources. The power across resistor $R_4$ may be measured to indicate the power from transmitter 19 and the power across resistor $R_5$ may be measured to indicate power from transmitter 21.

Although the invention has been described with respect to particular embodiments thereof, it is not to be so limited, as change and modifications may be made therein which are within the spirit and scope of the invention as defined by the appended claims.

I claim:
1. An apparatus for measuring power at various frequencies comprising a nonlinear device receiving input signals from two sources at different frequencies $f_1$ and $f_2$, a parallel trap parallel resonant at frequency $f_2$ connected to the nonlinear device, a second trap connected to the parallel trap and the combination of the parallel and second trap series resonant at a frequency of $f_1$, a second parallel trap connected to the nonlinear device and parallel resonant at frequency $f_1$, a fourth trap connected to the second parallel trap and series resonant at a frequency $f_1$, and a power measuring means connected across the fourth trap to measure power at frequency $f_2$, and to measure intermodulation products produced by the nonlinear device.

2. Apparatus for measuring power at various frequencies, comprising, a nonlinear device receiving input signals from two sources at different frequencies $f_1$ and $f_2$, a parallel trap connected to the output of the nonlinear device and parallel resonant at frequency $f_2$, a second trap having one end connected to the parallel trap and its other end connected through a load to ground the combination of the parallel and second traps series resonant at frequency $f_1$, a second parallel trap connected to the output of the nonlinear device and parallel resonant at frequency $f_1$, a second load connected between the second parallel trap and ground, and frequency selective power measuring means connected to the second load to measure power.

3. Apparatus for measuring power at various frequencies comprising a nonlinear device receiving input signals from a plurality of sources at frequencies $f_1$, $f_2$, and $f_3$, a parallel trap parallel resonant at frequency $f_2$, a second trap connected to the parallel trap and to ground and the combination of the parallel and second trap series resonant at frequency $f_1$, a second parallel trap connected to the nonlinear device and parallel resonant at frequency $f_2$, a fourth trap connected between the second parallel trap and ground and the combination of the second parallel and fourth traps series resonant at frequency $f_3$, a third parallel trap connected to the nonlinear device and parallel resonant at frequency $f_1$, a load connected between the third parallel trap and ground and a power measuring means connected to the load.

4. In apparatus according to claim 3 a fifth trap connected across the load and series resonant at frequency $f_1$.

5. In apparatus according to claim 3 a second load connected in series with the first parallel and second traps.

References Cited by the Examiner
UNITED STATES PATENTS

| | | | |
|---|---|---|---|
| 2,096,782 | 10/37 | Brown | 333—76 X |
| 2,855,508 | 10/58 | Barlow et al. | 333—76 X |
| 3,049,667 | 8/62 | Broadhead et al. | 324—81 |
| 3,098,231 | 7/63 | St. Vrain et al. | 333—76 X |

WALTER L. CARLSON, *Primary Examiner.*